(12) United States Patent
Ma et al.

(10) Patent No.: US 11,784,311 B2
(45) Date of Patent: Oct. 10, 2023

(54) SECONDARY BATTERY AND APPARATUS CONTAINING THE SECONDARY BATTERY

(71) Applicant: Contemporary Amperex Technology Co., Limited, Ningde (CN)

(72) Inventors: Jianjun Ma, Ningde (CN); Rui Shen, Ningde (CN); Libing He, Ningde (CN); Lei Chen, Ningde (CN); Baojian Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/544,964

(22) Filed: Dec. 8, 2021

(65) Prior Publication Data

US 2022/0102723 A1 Mar. 31, 2022

Related U.S. Application Data

(63) Continuation of application No. PCT/CN2020/081688, filed on Mar. 27, 2020.

(51) Int. Cl.
*H01M 4/583* (2010.01)
*H01M 4/131* (2010.01)
(Continued)

(52) U.S. Cl.
CPC ........... *H01M 4/583* (2013.01); *H01M 4/131* (2013.01); *H01M 4/133* (2013.01); *H01M 4/364* (2013.01);
(Continued)

(58) Field of Classification Search
None
See application file for complete search history.

(56) References Cited

U.S. PATENT DOCUMENTS

2017/0214037 A1* 7/2017 Uematsu ............... H01M 4/366

FOREIGN PATENT DOCUMENTS

| CN | 105470519 A | 4/2016 |
| CN | 106252569 A | 12/2016 |

(Continued)

OTHER PUBLICATIONS

Machine Language translation of KR 20140093877 (Year: 2014).*
(Continued)

*Primary Examiner* — Wyatt P McConnell
(74) *Attorney, Agent, or Firm* — East IP P.C.

(57) ABSTRACT

This application discloses a secondary battery and an apparatus containing the secondary battery. The secondary battery comprises a positive electrode plate comprising a positive active material and a negative electrode plate comprising a negative active material. The negative active material comprises a first material and a second material, the first material comprises artificial graphite, and the second material comprises natural graphite. The positive active material comprises one or more of layered lithium transition metal oxides and modified compounds thereof, and a smoothness L of a surface of the negative electrode film away from the negative electrode current collector satisfies: 40≤L≤50; or the positive active material comprises one or more of lithium-containing phosphates with olivine structure and modified compounds thereof, and a smoothness L of a surface of the negative electrode film away from the negative electrode current collector satisfies: 45≤L≤55.

20 Claims, 2 Drawing Sheets

(51) Int. Cl.
*H01M 4/133* (2010.01)
*H01M 4/36* (2006.01)
*H01M 4/485* (2010.01)
*H01M 10/052* (2010.01)
*H01M 4/02* (2006.01)

(52) U.S. Cl.
CPC .......... *H01M 4/366* (2013.01); *H01M 4/485* (2013.01); *H01M 10/052* (2013.01); *H01M 2004/021* (2013.01)

(56) References Cited

FOREIGN PATENT DOCUMENTS

| | | | |
|---|---|---|---|
| CN | 109888368 | A | 6/2019 |
| JP | 2004103435 | A | 4/2004 |
| JP | 2005259689 | A | 9/2005 |
| JP | 2005285447 | A | 10/2005 |
| JP | 2009110856 | A | 5/2009 |
| JP | 2012014895 | A | 1/2012 |
| JP | 2013239348 | A | 11/2013 |
| JP | 5892393 | B2 | 3/2016 |
| JP | 2016152077 | A | 8/2016 |
| JP | 2017073328 | A | 4/2017 |
| JP | 2017132989 | A | 8/2017 |
| JP | 2019087519 | A | 6/2019 |
| JP | 2021500707 | A | 1/2021 |
| KR | 20110023912 | A | 3/2011 |
| KR | 20140093877 | A | 7/2014 |
| WO | 2013088540 | A1 | 6/2013 |
| WO | 2019088503 | A1 | 5/2019 |

OTHER PUBLICATIONS

The First Office Action for Indian Application No. 202217030618, dated Nov. 1, 2022, 7 pages.
The International search report for PCT Application No. PCT/CN2020/081688, dated Dec. 29, 2020, 11 pages.
The Extended European Search Report for European Application No. 20927018.0, dated Jun. 3, 2022, 5 pages.
The First Office Action for Chinese Application No. 202080005576.0, dated Jun. 16, 2022, 13 pages.
The First Office Action for Japanese Application No. 2022-532164, dated Jul. 4, 2023, 12 pages.
The First Office Action for Korean Application No. 10-2022-7018083, dated Jun. 1, 2023, 15 pages.
The Search Report for Japanese Application No. 2022-532164, dated May 18, 2023, 29 pages.

* cited by examiner

SECONDARY BATTERY AND APPARATUS CONTAINING THE SECONDARY BATTERY

CROSS-REFERENCES TO RELATED APPLICATIONS

This application is a continuation of International application No. PCT/CN2020/081688, filed on Mar. 27, 2020, which is hereby incorporated by reference in its entirety.

TECHNICAL FIELD

This application belongs to the technical field of secondary battery, and specifically relates to a secondary battery and an apparatus containing the secondary battery.

BACKGROUND

Secondary batteries are wildly used due to their outstanding features such as reliable working performance, no pollution and no memory effect. For example, with increasing attention to environmental protection issue and increasing popularity of new energy vehicles, the demand for power type secondary battery will show explosive growth. However, as the application field of the secondary battery becomes more and more widespread, higher demand is put forward for low temperature power performance and energy density of the secondary battery. When the low temperature power performance of the secondary battery is worse, the use of the secondary battery in a low temperature environment is affected. The energy density will affect the endurance capacity of the battery, i.e. usable time after one charging process. Therefore, it is an urgent technical problem to be solved that how to improve the low temperature power performance of the secondary battery while maintaining higher energy density thereof.

SUMMARY

A first aspect of this application provides a secondary battery comprising a positive electrode plate and a negative electrode plate, wherein the positive electrode plate comprises a positive electrode current collector and a positive electrode film disposed on at least one surface of the positive electrode current collector and comprising a positive active material, the negative electrode plate comprises a negative electrode current collector and a negative electrode film disposed on at least one surface of the negative electrode current collector and comprising a negative active material. The positive active material comprises one or more of layered lithium transition metal oxides and modified compounds thereof; the negative active material comprises a first material and a second material, the first material comprises artificial graphite, the second material comprises natural graphite; a smoothness L of a surface of the negative electrode film away from the negative electrode current collector satisfies: 40≤L≤50, preferably 43≤L≤48.

A second aspect of this application provides a secondary battery comprising a positive electrode plate and a negative electrode plate, wherein the positive electrode plate comprises a positive electrode current collector and a positive electrode film disposed on at least one surface of the positive electrode current collector and comprising a positive active material, and the negative electrode plate comprises a negative electrode current collector and a negative electrode film disposed on at least one surface of the negative electrode current collector and comprising a negative active material. The positive active material comprises one or more of lithium-containing phosphates with olivine structure and modified compounds thereof; the negative active material comprises a first material and a second material, wherein the first material comprises artificial graphite, the second material comprises natural graphite; a smoothness L of a surface of the negative electrode film away from the negative electrode current collector satisfies: 45≤L≤55, preferably 48≤L≤52.

A second aspect of this application provides an apparatus comprising the secondary battery according to the first aspect of this application.

It is found surprisingly that, in the secondary battery of the present application, when the positive electrode plate comprises a certain type of positive active material, the negative active material of the negative electrode plate comprises artificial graphite and natural graphite both, and the smoothness of the surface of the negative electrode film away from the negative electrode current collector is controlled within a certain range, the negative electrode plate can have higher energy density, and improved active ions transmission performance, so that the secondary battery can have better low temperature power performance while having higher energy density. More preferably, the secondary battery can further have lower high temperature cyclic expansion and higher high temperature cyclic capacity retention rate at the same time. The apparatus in this application includes the secondary battery provided in this application and thus has the same advantages as the secondary battery at least.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

Figure 1:
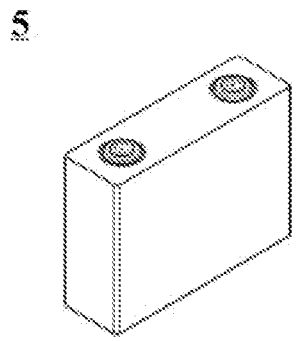
FIG. 1 is a schematic diagram of an embodiment of a secondary battery.

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Secondary Battery

A first aspect of this application provides a secondary battery. The secondary battery comprises a positive electrode plate, a negative electrode plate and an electrolyte. During the charging and discharging process of the battery, active ions intercalate and deintercalate between the positive electrode plate and the negative electrode plate. The electrolyte serves as conducting ions between the positive electrode plate and the negative electrode plate.

[Positive Electrode Plate]

A positive electrode plate may comprise a positive electrode current collector and a positive electrode film disposed on at least one surface of the positive electrode current collector. As an example, the positive electrode current collector has two opposite surfaces in the direction of its thickness, and the positive electrode film is laminated on either or both of the two surfaces of the positive electrode current collector.

The positive electrode current collector can adopt materials with good conductivity and mechanical strength, serving as conducting electricity and collecting current. In some embodiments, the positive electrode current collector may adopt an aluminum foil.

The positive electrode film comprises a positive active material. The positive active material can adopt positive active materials known for secondary battery in the art. In some embodiments, the positive active material may comprise one or more of layered lithium transition metal oxides, lithium-containing phosphates with olivine structure, and modified compounds thereof.

The "modified" in the "modified compounds" means that the material is modified by doping and/or surface coating.

In some embodiments, the positive active material comprises one or more of layered lithium transition metal oxides and modified compounds thereof. As an example, the positive active material may comprise, but not be limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and their modified compounds. Preferably, the positive active material comprises one or more of lithium nickel cobalt manganese oxide, lithium nickel cobalt aluminum oxides, and their modified compounds.

In some embodiments, the positive active material comprises one or more of $Li_aNi_bCO_cM_dM'_eO_fA_g$ and modified $Li_aNi_bCo_cM_dM'_eO_fA_g$ with a coating layer on at least part of its surface. $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$; M is selected from one or more of Mn and Al; M' is selected from one or more of Zr, Al, Zn, Cu, Cr, Mg, Fe, V, Ti and B, preferably is selected from one or more of Zr, Al, Zn and B; A is selected from one or more of N, F, S and Cl.

In some embodiments, M is selected from Mn, and M' is selected from one or more of Zr, Al, Zn, Cu, Cr, Mg, Fe, V, Ti and B, preferably is selected from one or more of Zr, Al, Zn and B. Alternatively, M is selected from Al, and M' is selected from one or more of Zr, Zn, Cu, Cr, Mg, Fe, V, Ti, and B, preferably is selected from one or more of Zr, Zn and B.

The positive active material comprises a high nickel ternary positive active material, and thus can have higher gram capacity, thereby increasing the energy density of the battery.

In some embodiments, the coating layer can be found on 80% to 100% of the surface of $Li_aNi_bCo_eM_dM'_eO_fA_g$ particles. Further, the coating layer can be found on 90% to 100% of the surface of $Li_aNi_bCo_eM_dM'_eO_fA_g$ particles.

In other embodiments, the positive active material comprises one or more of lithium-containing phosphates with olivine structure and modified compounds thereof. As an example, the lithium-containing phosphates with olivine structure may comprise, but not be limited to one or more of lithium iron phosphate, a composite of lithium iron phosphate with carbon, lithium manganese phosphate, a composite of lithium manganese phosphate with carbon, and modified compounds thereof.

The composite of lithium iron phosphate with carbon can be one or more of a coated composite and an embedded composite. The coated composite means that at least part of the surface of lithium iron phosphate particles has a carbon coating layer. For example, the carbon coating layer is coated on 80% to 100% (such as 90% to 100%) of the surface of lithium iron phosphate particles. The carbon coating layer may comprise one or more of graphite, hard carbon, soft carbon, carbon black, coke, and the like. The embedded composite means that lithium iron carbonate is dispersed in a carbon carrier. The carbon carrier may comprise one or more of graphite, hard carbon, soft carbon, carbon black, coke, and the like.

The composite of lithium manganese phosphate with carbon can be one or more of a coated composite and an embedded composite. The coated composite means that at least part of the surface of lithium manganese phosphate particles has a carbon coating layer. For example, the carbon coating layer is coated on 80% to 100% (such as 90% to 100%) of the surface of lithium manganese phosphate particles. The carbon coating layer may comprise one or more of graphite, hard carbon, soft carbon, carbon black, coke, and the like. The embedded composite means that lithium manganese carbonate is dispersed in a carbon carrier. The carbon carrier may comprise one or more of graphite, hard carbon, soft carbon, carbon black, coke, and the like.

In some embodiments, the positive electrode film may also comprise an optional binder. The type of binder is not specifically limited, and may be chosen by those skilled in the art according to actual needs. As an example, the binder used for the positive electrode film may comprise one or more of the polyvinylidene fluoride (PVDF) and polytetrafluoroethylene (PTFE).

In some embodiments, the positive electrode film may also comprise an optional conductive agent. The type of the conductive agent is not specifically limited, and may be chosen by those skilled in the art according to actual needs. As an example, the conductive agent used for the positive electrode film may comprise one or more of graphite, superconducting carbon, acetylene black, carbon black, Ketjen black, carbon dots, carbon nanotubes, graphene, and carbon nanofibers.

[Negative Electrode Plate]

The negative electrode plate comprises a negative electrode current collector and a negative electrode film disposed on at least one surface of the negative electrode current collector. As an example, the negative electrode current collector has two opposite surfaces in the direction of its thickness, and the negative electrode film is laminated on either or both of the two surfaces of the negative electrode current collector.

The negative electrode current collector can adopt materials with good conductivity and mechanical strength, serving as conducting electricity and collecting current. In some embodiments, the negative electrode current collector may adopt a copper foil.

The negative electrode film comprises a negative active material which comprises a first material and a second material, the first material comprises artificial graphite, and the second material comprises natural graphite. It is found surprisingly that when a smoothness L of a surface of the negative electrode film away from the negative electrode current collector is further controlled within a certain range, the negative electrode plate can have higher energy density and effectively improved active ions transmission performance, so that the secondary battery adopting it can have increased low temperature power performance while having higher energy density. More preferably, the secondary battery can further have lower high temperature cyclic expansion and higher high temperature cyclic capacity retention rate at the same time.

The smoothness L reflects the roughness degree of the surface of the negative electrode film away from the negative electrode current collector. The smoothness L can be provided within the required range by regulating one or more of selection of first material, selection of second material, the ratio of first material to second material, the ratio of natural graphite, the pressed density of negative electrode film, the type of conductive agent, and the content of conductive agent. The selection of first material and second material can respectively comprise, but not be limited to one or more of their composition, graphitization degree, particle size distribution, surface coating modification, and the like.

The inventors have found through further study that devising the negative electrode plate in combination with the positive active material adopted in the battery can enable the secondary battery to have better performance. The inventors have found through deep study that, when the positive active material of the positive electrode plate comprises one or more of layered lithium transition metal oxides and modified compounds thereof, a surface of the negative electrode film away from the negative electrode current collector satisfies: $40 \leq L \leq 50$.

When the positive active material comprises one or more of layered lithium transition metal oxides and modified compounds thereof, the negative active material of the negative electrode plate comprises artificial graphite and natural graphite both, and the smoothness L of the negative electrode film satisfies $40 \leq L \leq 50$, an effective coordination can be formed between the positive active material and the negative active material so as to sufficiently utilize the synergistic effect of the advantages thereof, which enables the negative electrode plate to have a surface porosity suitable for electrolytic solution infiltration and improve active ions solid-phase diffusion rate in the negative electrode while the battery having higher energy density, thereby further improving active ions transmission performance between the positive electrode and the negative electrode. Therefore, the kinetic performance of the battery is significantly improved, the active ions from positive electrode may be accepted quickly by the negative electrode even in a low temperature environment, thereby improving the low temperature power performance of the secondary battery. The secondary battery is suitable for being charged and discharged at a high rate, and has a significantly reduced probability of lithium precipitation when it is charged at a high rate and a low temperature, and the secondary battery also has higher safety performance. Moreover, when the positive active material comprises one or more of layered lithium transition metal oxides and modified compounds thereof, the positive electrode plate can have higher areal density (for example, from 14 mg/cm$^2$ to 20 mg/cm$^2$) and higher pressed density (for example, from 3.3 g/cm$^3$ to 3.5 g/cm$^3$) so as to make the battery have higher energy density.

In these embodiments, more preferably, the positive active material is one or more of lithium nickel cobalt manganese oxide, lithium nickel cobalt aluminum oxide, and modified compounds thereof. As such, above effects may be achieved well.

The inventors have also found that when the positive active material is one or more of lithium nickel cobalt manganese oxide, lithium nickel cobalt aluminum oxide, and modified compounds thereof, the negative active material comprises artificial graphite and natural graphite both, and the smoothness L of the negative electrode film satisfies $40 \leq L \leq 50$, the negative electrode plate can have higher cohesion and adhesion strength so as to further reduce the expansion of the negative electrode during the cycle process of the battery; and the electrode plate can also have increased electrolytic solution retention capability so as to make the electrode plate have further increased kinetic performance while maintaining higher volume energy density.

Further, the negative electrode plate has higher ions and electrons transmission performance, which enables the battery to have lower resistance. Moreover, when the negative electrode plate comprises artificial graphite and natural graphite both, and the smoothness L of the negative electrode film satisfies $40 \leq L \leq 50$, for example, L is 40.5, 41.6, 42.3, 43.5, 44.8, 45.5, 46.0, 46.5, 47.0, 47.5, 48.0, 48.5 or 49.7, the loss of active material caused by poor contact between particles, and/or polarization of the battery caused by non-uniform electrolytic solution distribution can be reduced. Therefore, the battery can further have higher high temperature cyclic capacity retention rate.

In these embodiments, preferably, $43 \leq L \leq 48$. When the smoothness L of the negative electrode film is within a proper range, the low temperature power performance of the battery can have further improved, the high temperature cyclic expansion of the battery can be further decreased and the high temperature cyclic capacity retention rate of the battery can be further increased.

The inventors have found through further study that when the positive active material comprises one or more of lithium nickel cobalt manganese oxide, lithium nickel cobalt aluminum oxide, and modified compounds thereof, the negative active material comprises artificial graphite and natural graphite both, and the smoothness L of the negative electrode film satisfies $40 \leq L \leq 50$, the performances of the battery can be further improved if the negative active material further satisfies with one or more of following conditions.

In some preferred embodiments, the natural graphite can constitute from 10% to 50% by mass of the negative active material, preferably from 15% to 30% by mass, more preferably from 15% to 25% by mass, for example, 15%, 17%, 19%, 20%, 21%, and 23% by mass. When the negative active material comprises the proper amount of natural graphite, the negative active material can have higher gram capacity, especially, the negative electrode plate can have further improved ions solid-phase diffusion rate, thereby enabling the battery to have higher energy density and improved power performance. Moreover, the proper amount of natural graphite can improve the adhesion strength between the negative active material particles and the adhesion strength between the negative active material and the negative electrode current collector so as to enable the negative electrode plate to have higher cohesion and adhesion strength, and reduce the side reactions at the surface of the negative electrode, thereby enabling the battery to have lower high temperature cyclic expansion. The high temperature cycle performance of the battery can also be further improved.

In some preferred embodiments, the negative active material may have a powder compacted density of from 1.7 $g/cm^3$ to 1.9 $g/cm^3$ under an action force of 30,000 N, preferably from 1.75 $g/cm^3$ to 1.85 $g/cm^3$. When the powder compacted density of the negative active material is within the proper range, the negative electrode film can have a higher pressed density so as to improve the energy density of the battery.

In order to make the powder compacted density of the negative active material within the above range, in some preferred embodiments, natural graphite has a powder compacted density of preferably from 1.75 $g/cm^3$ to 1.9 $g/cm^3$ under an action force of 30,000 N, more preferably from 1.75 $g/cm^3$ to 1.85 $g/cm^3$; artificial graphite has a powder compacted density of preferably from 1.7 $g/cm^3$ to 1.9 $g/cm^3$ under an action force of 30,000 N, more preferably from 1.8 $g/cm^3$ to 1.9 $g/cm^3$.

In some preferred embodiments, the negative active material can have a graphitization degree of from 92% to 96%, preferably from 93% to 95%. When the graphitization degree of the negative active material is within the proper range, it can have a smaller powder resistivity so as to reduce the resistance of the negative electrode plate and have an interlayer spacing suitable for intercalation and deintercalation of ions, thereby further improving the low temperature power performance of the battery. Besides, the negative electrode plate adopting the negative active material also has higher cohesion and adhesion strength, thereby further decreasing the cyclic expansion of the battery.

The inventors have also found that when the positive active material comprises one or more of lithium nickel cobalt manganese oxide, lithium nickel cobalt aluminum oxide, and modified compounds thereof, the negative active material comprises artificial graphite and natural graphite, and the smoothness L of the negative electrode film is within a certain range, the high temperature cycle performance of the battery can be further improved if the graphitization degree of the negative active material is within the above range.

In order to make the graphitization degree of the negative active material within the above range, in some preferred embodiments, the graphitization degree of natural graphite can be from 95% to 98.5%, preferably from 96% to 98%, more preferably from 96.5% to 97.6%; the graphitization degree of artificial graphite can be from 90% to 97.5%, preferably from 90% to 95%, more preferably from 91% to 93.5%.

In some preferred embodiments, the negative active material may have a volume average particle size $D_v50$ of from 10 µm to 18 µm, preferably from 11 µm to 15 µm, more preferably from 12 µm to 14 µm. The smaller $D_v50$ of the negative active material is, the more the amount of particles on the surface of the negative electrode film is, the rebound of the electrode plate after cold pressing is larger, the particles on the surface of the negative electrode film will be embedded in each other so as to increase the surface roughness increase, and therefore, the smoothness of the surface of the negative electrode film can be smaller so as to improve electrolytic solution infiltration and ions migration rate in the negative electrode film. When the negative active material has the proper $D_v50$, it can enable the negative electrode film to have higher active ions migration rate, and can also improve the gram capacity of the negative active material and reduce active sites on the surface of the electrode plate, thereby improving the low temperature power performance, the energy density and the high temperature cycle performance of the battery at the same time.

In order to make $D_v50$ of the negative active material within the above range, in some embodiments, $D_v50$ of natural graphite can be from 10 µm to 16 µm, preferably from 10 µm to 14 µm, more preferably from 11 µm to 13 µm; $D_v50$ of artificial graphite can be from 12 µm to 19 µm, preferably from 12 µm to 16 µm, more preferably from 13 µm to 15 µm.

In some preferred embodiments, the pressed density of the negative electrode film is from 1.6 $g/cm^3$ to 1.8 $g/cm^3$, preferably from 1.65 $g/cm^3$ to 1.75 $g/cm^3$, and especially preferably from 1.68 $g/cm^3$ to 1.73 $g/cm^3$. When the positive active material is one or more of lithium nickel cobalt manganese oxide, lithium nickel cobalt aluminum oxide, and modified compounds thereof, the negative active material comprises artificial graphite and natural graphite, the smoothness L of the negative electrode film is within a certain range, and the pressed density of the negative electrode film is within the given range, the battery can be guaranteed to obtain a higher energy density; the negative electrode film also has higher electrolytic solution infiltration and good ions solid-phase diffusion rate, thereby further improving the power performance of the battery. Besides, a proper pressed density can also maintain the structural integrity of the negative active material particles, which is conducive to improving the cohesion and adhesion strength of the negative electrode plate and reducing the expansion and the side reactions during the high temperature cycle process of the battery, thereby further increasing the high temperature cycle life of the battery.

In some preferred embodiments, the areal density of the negative electrode film was from 10 $mg/cm^2$ to 13 $mg/cm^2$, preferably from 10.5 $mg/cm^2$ to 11.5 $mg/cm^2$. When the positive material comprises one or more of lithium nickel cobalt manganese oxide, lithium nickel cobalt aluminum oxide, and modified compounds thereof, the negative active material comprises artificial graphite and natural graphite, the smoothness L of the negative electrode film is within a certain range, and the areal density of the negative electrode film is within the given range, the battery can obtain a higher energy density. At the same time, the battery further has better ions and electrons transmission performance, thereby further improving the kinetic performance of the battery. Besides, when the battery satisfies the above design, the polarization and the side reactions can be reduced, thereby further improving the high temperature cycle performance of the battery.

The inventors have also found that when the positive active material of the positive electrode plate comprises one or more of lithium-containing phosphates with olivine structure and modified compounds thereof, preferably, a smoothness L of a surface of the negative electrode film away from the negative electrode current collector satisfies: 45≤L≤55.

When the positive active material comprises one or more of lithium-containing phosphates with olivine structure and modified compounds thereof, the negative active material of the negative electrode plate comprises artificial graphite and natural graphite both, and the smoothness L of the negative electrode film satisfies 45≤L≤55, an effective coordination can be formed between the positive active material and the negative active material so as to sufficiently utilize the synergistic effect of the advantages thereof, which further improves active ions solid-phase diffusion rate between the positive electrode and the negative electrode while the battery having higher energy density. Therefore, the kinetic performance of the battery is further improved, and the active ions from positive electrode can be accepted quickly by the negative electrode even in a low temperature environment, thereby improving the low temperature power performance of the secondary battery. The secondary battery is suitable for being charged and discharged at a high rate, and has a significantly reduced probability of lithium precipitation when it is charged at a high rate and a low temperature.

In these embodiments, more preferably, the positive active material comprises one or more of lithium iron phosphate, a composition of lithium iron phosphate with carbon, and modified compounds thereof. As such, above effects may be achieved well.

The inventors have also found that when the positive active material comprises one or more of lithium iron phosphate, a composition of lithium iron phosphate with carbon, and modified compounds thereof, the negative active material comprises artificial graphite and natural graphite both, and the smoothness L of the negative electrode film satisfies 45≤L≤55, the expansion during the cycle process of the battery can be further reduced; moreover, the electrode plate can have increased electrolytic solution retention capability between active materials, which is beneficial to increasing the kinetic performance while maintaining higher volume energy density.

Further, the negative electrode plate has higher ions and electrons transmission performance, which enables the battery to have lower resistance. Moreover, when the negative electrode plate comprises artificial graphite and natural graphite both, and the smoothness L of the negative electrode film satisfies 45≤L≤55, the loss of active material caused by poor contact between particles, and/or polarization of the battery caused by non-uniform electrolytic solution distribution can be reduced. Therefore, the battery can further have higher high temperature cyclic capacity retention rate.

In these embodiments, more preferably, 48≤L≤52. For example, L is 48.5, 49.0, 49.5, 50.0, 50.5, 51.0 or 51.5. When the smoothness L of the negative electrode film is within a proper range, the low temperature power performance of the battery can have further improved, the high temperature cyclic expansion of the battery can be further decreased and the high temperature cyclic capacity retention rate of the battery can be further increased.

The inventors have found through further study that when the positive active material comprises one or more of lithium-containing phosphates with olivine structure and modified compounds thereof, the negative active material comprises artificial graphite and natural graphite both, and the smoothness L of the negative electrode film satisfies 45≤L≤55, the performances of the battery can be further improved if the negative active material further satisfies with one or more of following conditions.

In some preferred embodiments, the natural graphite can constitute from 10% to 50% by mass of the negative electrode active material, preferably from 15% to 50% by mass, more preferably from 35% to 50% by mass, for example, 30%, 35%, 40%, 42%, 45%, 48% or 50% by mass. When the negative active material comprises the proper amount of natural graphite, the negative active material can have higher gram capacity, especially, the negative electrode plate can have further improved ions solid-phase diffusion rate, thereby enabling the battery to have higher energy density and improved power performance. Moreover, the proper amount of natural graphite can improve the adhesion strength between the negative active material particles and the adhesion strength between the negative active material and the negative electrode current collector so as to enable the negative electrode plate to have higher cohesion and adhesion strength, and reduce the side reactions at the surface of the negative electrode, thereby enabling the battery to have lower high temperature cyclic expansion. The high temperature cycle performance of the battery can also be further improved.

In some preferred embodiments, the negative active material may have a powder compacted density of preferably from 1.8 $g/cm^3$ to 1.9 $g/cm^3$ under an action force of 30,000 N, more preferably from 1.82 $g/cm^3$ to 1.88 $g/cm^3$. When the powder compacted density of the negative active material is within the proper range, the negative electrode film can have a higher pressed density so as to improve the energy density of the battery.

In order to make the powder compacted density of the negative active material within the above range, in some preferred embodiments, natural graphite has a powder compacted density of preferably from 1.85 $g/cm^3$ to 1.95 $g/cm^3$ under an action force of 30,000 N, more preferably from 1.90 $g/cm^3$ to 1.95 $g/cm^3$; artificial graphite has a powder compacted density of from 1.75 $g/cm^3$ to 1.85 $g/cm^3$ under an action force of 30,000 N, more preferably from 1.77 $g/cm^3$ to 1.80 $g/cm^3$.

In some preferred embodiments, the negative active material has a graphitization degree of from 92% to 95%, preferably from 93% to 94%. When the graphitization degree of the negative active material is within the proper range, it can have a smaller powder resistivity so as to reduce the resistance of the negative electrode plate and have an interlayer spacing suitable for intercalation and deintercalation of ions, thereby further improving the low temperature power performance of the battery. Besides, the negative electrode plate adopting the negative active material also has higher cohesion and adhesion strength, thereby further decreasing the cyclic expansion of the battery.

The inventors have also found that when the positive active material comprises one or more of lithium-containing phosphates with olivine structure and modified compounds thereof, the negative active material comprises artificial graphite and natural graphite, the smoothness L of the negative electrode film is within a certain range, and the graphitization degree of the negative active material is within the above range, the high temperature cycle performance of the battery can be further improved.

In order to make the graphitization degree of the negative active material within the above range, in some preferred embodiments, the graphitization degree of natural graphite can be from 95% to 98.5%, preferably from 97.5% to 98.5%; the graphitization degree of artificial graphite can be from 89% to 95%, preferably from 90% to 93%.

In some preferred embodiments, the negative active material has a volume average particle size $D_v50$ of from 15 μm to 19 μm, preferably from 16 μm to 18 μm. The smaller $D_v50$ of the negative active material is, the amount of pores on the surface of the negative electrode film is more, the smoothness of the surface of the negative electrode film is smaller so as to improve electrolytic solution infiltration and ions migration rate in the negative electrode film. When the negative active material has the proper $D_v50$, it can enable the negative electrode film to have higher ions migration rate, and can also improve the gram capacity of the negative active material and reduce active sites on the surface of the electrode plate, thereby improving the low temperature power performance, the energy density and the high temperature cycle performance of the battery at the same time.

In order to make $D_v50$ of the negative active material within the above range, in some embodiments, $D_v50$ of natural graphite can be from 15 μm to 20 μm, preferably from 15 μm to 19 μm, more preferably from 16 μm to 18 μm; $D_v50$ of artificial graphite can be from 14 μm to 19 μm, preferably from 14 μm to 18 μm, more preferably from 15 μm to 17 μm.

In some preferred embodiments, the negative electrode film has a pressed density of from 1.5 g/cm$^3$ to 1.7 g/cm$^3$, preferably from 1.55 g/cm$^3$ to 1.65 g/cm$^3$. When the positive material comprises one or more of lithium-containing phosphates with olivine structure and modified compounds thereof, the negative active material comprises artificial graphite and natural graphite both, the smoothness L of the negative electrode film is within a certain range, and the pressed density of the negative electrode film is within the given range, the battery can be provided with a higher energy density; at the same time, the negative electrode film can have higher electrolytic solution infiltration and good ions solid-phase diffusion rate, thereby further improving the low temperature power performance of the battery. Moreover, a proper pressed density can also maintain the structural integrity of the negative active material particles, which is conducive to improving the cohesion and adhesion strength of the negative electrode plate and reducing the expansion and the side reactions during the high temperature cycle process of the battery, thereby further increasing the high temperature cycle life of the battery.

In some preferred embodiments, the negative electrode film has an areal density of from 7 mg/cm$^2$ to 10 mg/cm$^2$, preferably from 7 mg/cm$^2$ to 8 mg/cm$^2$. When the positive material comprises one or more of lithium-containing phosphates with olivine structure and modified compounds thereof, the negative active material comprises artificial graphite and natural graphite, the smoothness L of the negative electrode film is within a certain range, and the areal density of the negative electrode film is within the given range, the battery can obtain a higher energy density. At the same time, the battery further has better ions and electrons transmission performance, thereby further improving the kinetic performance of the battery. Besides, when the battery satisfies the above design, the polarization and the side reactions can be reduced, thereby further improving the high temperature cycle performance of the battery.

In any negative electrode plate of the present application, optionally, the negative active material may further include one or more of hard carbon, soft carbon, silicon-based materials, and tin-based materials. The silicon-based material may be selected from one or more of elemental silicon, silicon oxide, silicon carbon composite, and silicon alloy. The tin-based material may be selected from one or more of elemental tin, tin oxide compound, and tin alloy.

In some embodiments, the negative electrode film may also include a binder. As an example, the binder used for the negative electrode film can be selected from one or more of polyacrylic acid (PAA), sodium polyacrylate (PAAS), polyacrylamide (PAM), polyvinyl alcohol (PVA), styrene butadiene rubber (SBR), sodium alginate (SA), polymethylacrylic acid (PMAA) and carboxymethyl chitosan (CMCS).

In some embodiments, the negative electrode film may optionally include a thickener. As an example, the thickener may be sodium carboxymethyl cellulose (CMC-Na).

In some embodiments, the negative electrode film may optionally include a conductive agent. As an example, the conductive agent used for the negative electrode film may be selected from one or more of superconducting carbon, acetylene black, carbon black, Ketjen black, carbon dots, carbon nanotubes, graphene, and carbon nanofibers.

In the present application, the smoothness L of the negative electrode film has the meaning known in the art, and can be measured by methods known in the art. For example, an exemplary measuring method is as follows: firstly, put the negative electrode plate below a measuring port of a precise color reader (for example, a multifunctional precise color reader NR60CP), make the measuring port of the precise color reader close to the negative electrode film, adjust the position thereof so as to achieve alignment, measure and record the test result. To ensure the accuracy of the test result, 10 groups of test samples can be measured, and an average value of 10 groups of test samples is calculated.

In the present application, the powder compacted density of the negative active material has the meaning known in the art, and can be measured by methods known in the art. For example, an electronic compression-testing machine (for example, UTM7305) is used to carry out the measurement with reference to GB/T 24533-2009. An exemplary measuring method is as follows: put test powder sample with a mass of M on a special compaction mold (with a bottom area of S), set different pressures (in the present application, the pressure is 30,000 N) and hold for 30 seconds, release the pressure, and after 10 seconds, read the thickness H of the compacted powder under a certain pressure from the instrument. The powder compacted density of the negative active material under a certain pressure is determined as M/(H×S).

In the present application, the areal density of the negative electrode film has the meaning known in the art, and can be measured by methods known in the art. For example, take the negative electrode plate which has been coated on one side and cold pressed (if the electrode plate is coated on two sides, the negative electrode film on one side can be wiped off firstly), cut it into small disks with an area of $S_1$, and get the weight recorded as $M_1$. Then the negative electrode film of the weighed negative electrode plate is wiped off and the negative electrode current collector is weighed and recorded as $M_0$. The areal density of the negative electrode film is determined as (weight of negative electrode plate $M_1$−weight of negative electrode current collector $M_0$)/$S_1$.

In the present application, the pressed density of the negative electrode film has the meaning known in the art, and can be measured by methods known in the art. For example, take the negative electrode plate which has been coated on one side and cold pressed (if the electrode plate is coated on two sides, the negative electrode film on one side can be wiped off firstly), measure the thickness of the negative electrode film and determine the areal density of the negative electrode film according to the above measuring method. The pressed density of the negative electrode film=the areal density of the negative electrode film/the thickness of the negative electrode film.

In the present application, $D_v50$ of the negative electrode active material has the meaning known in the art, and can be measured by methods known in the art. For example, $D_v50$ can be measured by a laser particle size analyzer (such as Malvern Master Size 3000) with reference to GB/T 19077.1-2016. Physical definition of $D_v50$ is the particle size at which the material reaches 50% of cumulative volume distribution percentage.

In the present application, the graphitization degree of the negative active material has the meaning known in the art, and can be measured by methods known in the art. For example, it can be measured by an X-ray diffractometer (such as Bruker D8 Discover). $d_{002}$ can be measured with reference to JIS K 0131-1996 and JB/T 4220-2011, and then the graphitization degree is calculated according to the formula of $G=(0.344-d_{002})/(0.344-0.3354)\times 100\%$, where $d_{002}$ is the interlayer spacing in nm in the crystal structure of graphite. In the X-ray diffractometer analysis, $CuK_\alpha$ ray is used as radiation source, a ray wavelength $\lambda$ is 1.5418 Å, a scanning angle $2\theta$ is from 20° to 80° and a scanning rate is 4°/min.

[Electrolyte]

Electrolytes act as conducting ions between the positive electrode plate and the negative electrode plate. This application has no specific limitation on the type of electrolyte, which can be selected according to requirements. For example, electrolytes can be at least one selected from a solid electrolyte and a liquid electrolyte, i.e. electrolytic solution.

In some embodiments, the electrolytic solution is used as an electrolyte. The electrolytic solution includes electrolyte salts and solvents.

In some embodiments, the electrolyte salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

In some embodiments, the organic solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, the electrolytic solution may further optionally include additives. For example, the additives may include negative electrode film-forming additives, positive electrode film-forming additives, and additives that can improve some performances of the battery, such as additives that improve overcharge performance of the battery, additives that improve high temperature performance of the battery, and additives that improve low temperature performance of the battery.

[Separator]

Secondary batteries using an electrolytic solution, as well as some secondary batteries using solid electrolytes, also include a separator. The separator is arranged between the positive electrode plate and the negative electrode plate, which acts as isolation. This application has no special limitation on the type of separators, and any well-known porous structure separator with good chemical and mechanical stability can be selected. In some embodiments, the material of the separator may be selected from one or more of glass fiber, non-woven fabric, polyethylene, polypropylene, and polyvinylidene fluoride. The separator may be a single-layer film or a multilayer composite film. When the separator is a multilayer composite film, the materials of each layer may be the same or different.

The present application does not have particular limitation to the shape of the secondary battery. The secondary battery may be cylindrical, square, or in other arbitrary shape. FIG. 1 shows a secondary battery 5 with a square structure as an example.

In some embodiments, the secondary battery may include an outer package for packaging the positive electrode plate, the negative electrode plate, and the electrolyte.

In some embodiments, the outer package of the secondary battery may be a soft bag, such as a pocket type soft bag. The material of the soft bag may be plastic, for example, it may include one or more of polypropylene (PP), polybutylene terephthalate (PBT), polybutylene succinate (PBS), and the like. The outer package of the secondary battery may also be a hard case, such as a hard plastic case, an aluminum case, a steel case, and the like.

Figure 2:
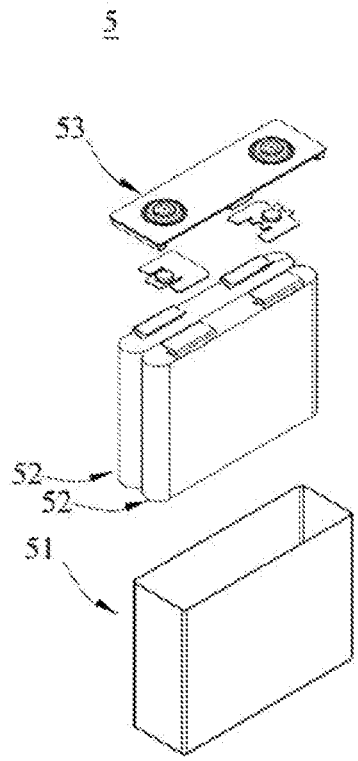
FIG. 2 is an exploded view of FIG. 1.

In some embodiments, referring to FIG. 2, the outer package may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity.

The positive electrode plate, the negative electrode plate, and the separator may form an electrode assembly 52 by winding or stacking. The electrode assembly 52 is packaged in the receiving cavity. The electrolyte may adopt an electrolytic solution, and the electrolytic solution infiltrates the electrode assembly 52. The secondary battery 5 includes one or more electrode assemblies 52, which can be adjusted according to requirements.

In some embodiments, the secondary batteries may be assembled into a battery module, the battery module may include a plurality of secondary batteries, and the specific number can be adjusted according to the application and capacity of the battery module.

Figure 3:
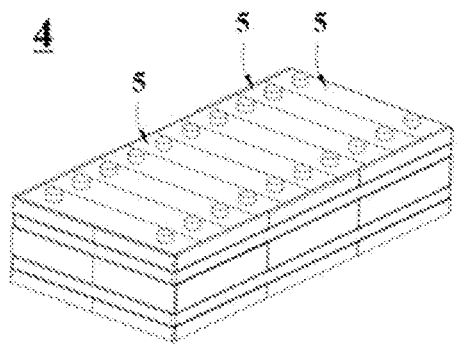
FIG. 3 is a schematic diagram of an embodiment of a battery module.

FIG. 3 shows a battery module 4 as an example. Referring to FIG. 3, in the battery module 4, a plurality of secondary batteries 5 may be arranged sequentially in a length direction of the battery module 4. Of course, they may also be arranged in any other way. Further, a plurality of secondary batteries 5 may be fixed by fasteners.

Optionally, the battery module 4 may further include a housing having a receiving space, and a plurality of secondary batteries 5 are received in the receiving space.

In some embodiments, the above-mentioned battery module may also be assembled into a battery pack, and the number of battery modules included in the battery pack can be adjusted according to the application and capacity of the battery pack.

Figure 4:
FIG. 4 is a schematic diagram of an embodiment of a battery pack.
Figure 5:
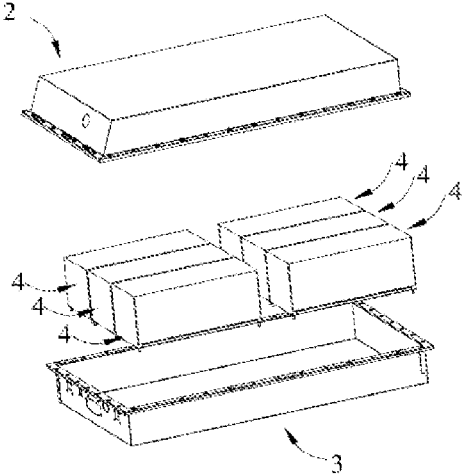
FIG. 5 is an exploded view of FIG. 4.

FIGS. 4 and 5 show a battery pack 1 as an example. Referring to FIGS. 4 and 5, the battery pack 1 may include a battery case and a plurality of battery modules 4 disposed in the battery case. The battery case includes an upper case body 2 and a lower case body 3. The upper case body 2 can cover the lower case body 3 to form a closed space for receiving the battery modules 4. A plurality of battery modules 4 can be arranged in the battery case in any manner.

[Preparation]

The preparation method of the secondary battery may include the step of assembling the negative electrode plate, the positive electrode plate and the electrolyte into a secondary battery. In some embodiments, the positive electrode plate, the separator and the negative electrode plate are wound or stacked in order in which the separator is disposed between the positive electrode plate and the negative electrode plate to serve as an isolation, thereby obtaining an electrode assembly, i.e. a battery core; and the battery core is placed in an outer package, injected with the electrolytic solution, and sealed to obtain the secondary battery.

In some embodiments, the preparation of secondary battery may also include the step of preparing a positive electrode plate. As an example, the positive electrode plate can be obtained by dispersing a positive active material, a conductive agent and a binder into a solvent (for example, N-methylpyrrolidone, abbreviated as NMP) to form a uniform positive electrode slurry; the positive electrode slurry is coated on the positive electrode current collector followed by drying and cold pressing, thereby obtaining the positive electrode plate.

In some embodiments, the preparation of secondary battery may also include the step of preparing a negative electrode plate. As an example, the negative electrode plate can be obtained by dispersing a negative active material, a binder, an optional thickener and an optional conductive agent into a solvent in which the solvent is deionized water to form a uniform negative electrode slurry; the negative electrode slurry is coated on the negative electrode current collector followed by drying and cold pressing, thereby obtaining the negative electrode plate.

[Apparatus]

The second aspect of the present application provides an apparatus, the apparatus including the secondary battery according to the first aspect of the present application. The secondary battery can be used as a power source of the apparatus, and as an energy storage unit of the apparatus. The apparatus may be, but not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The apparatus may select the secondary battery, the battery module, or the battery pack according to its usage requirements.

Figure 6:
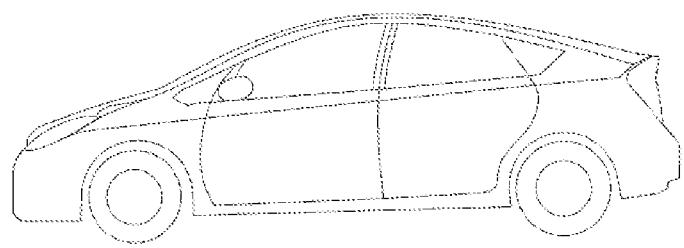
FIG. 6 is a schematic diagram of an embodiment of an apparatus using the secondary battery as a power source.

FIG. 6 shows an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module may be used.

As another example, the apparatus may be a mobile phone, a tablet computer, a notebook computer, and the like. The apparatus is generally required to be thin and light, and the secondary battery can be used as a power source.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Positive Electrode Plate

A positive active material $LiNi_{0.8}Co_{0.1}Mn_{0.1}O_2$ (abbreviated as NCM 811), a conductive agent Super P and a binder PVDF at a mass ratio of 96.5:1.5:2 were dispersed in an appropriate amount of NMP with stirring to form a uniform positive electrode slurry, and then both surfaces of an aluminum foil as a positive electrode current collector were coated with the positive electrode slurry, thereby obtaining a positive electrode plate after steps of drying, cold pressing and the like.

Negative Electrode Plate

A negative active material (75 wt % of artificial graphite and 25 wt % of natural graphite), a conductive agent Super P, a binder SBR, and a thickener CMC-Na were mixed and fully stirred at a mass ratio of 96.2:0.8:1.8:1.2 in an appropriate amount of deionized water to form a uniform negative electrode slurry; and both surfaces of a copper foil as a negative electrode current collector were coated with the negative electrode slurry, thereby obtaining a negative electrode plate after steps of drying, cold pressing and the like.

Separator

A PE/PP composite film was used as the separator.

Preparation of an Electrolytic Solution

Ethylene carbonate (EC), ethyl methyl carbonate (EMC), and diethyl carbonate (DEC) at a volume ratio of 1:1:1 were mixed, and then $LiPF_6$ was dissolved uniformly in the solution to obtain an electrolytic solution, wherein $LiPF_6$ had a concentration of 1 mol/L.

Preparation of a Secondary Battery

The positive electrode plate, the separator and the negative electrode plate were stacked in order and wound into an electrode assembly, which was put into an outer package, and in which the electrolytic solution prepared above was injected followed by sealing, standing, formation and aging, thereby obtaining a secondary battery Examples 2-25 and Comparative Examples 1-12

The preparation method was similar to that of Example 1 with the exception that the parameters for the preparation process of the negative electrode plate were adjusted so as to obtain the corresponding secondary battery, as shown in Table 1 and Table 2; and that the positive active material used in batteries of Examples 1-12 (Ex. 2-12) and Comparative Examples 1-6 (CE. 1-6) shown in Table 1 was NCM811, and the positive electrode film having a pressed density of 3.5 g/cm³ and an areal density of 18.5 mg/cm²; and that the positive active material used in batteries of Examples 13-25 (Ex. 13-25) and Comparative Examples 7-12 (CE. 7-12) shown in Table 2 was lithium iron phosphate (abbreviated as LFP), and the positive electrode film having a pressed density of 2.3 g/cm³ and an areal density of 16.2 mg/cm².

Test Section

For the following tests, the discharge cut-off voltage was 2.8 V and the charge cut-off voltage was 4.2 V when the positive active material was lithium nickel cobalt manganese oxide; the discharge cut-off voltage was 2.5 V and the charge cut-off voltage was 3.65 V when the positive active material was lithium iron phosphate.

1) Testing of Cyclic Expansion Rate of Negative Electrode Plate

Recorded an initial thickness of the negative electrode plate of each of the examples and comparative examples as $H_0$. Then, in an environment of 25° C., the charging and discharging test of the battery was carried out as follows: the battery was discharged at a constant current of 1.0 C (i.e. the current value at which the theoretical capacity was completely discharged within 1 hour) to the discharging cut-off voltage; then the battery was charged at a constant current of 1.0 C to the charge cut-off voltage, and then charged at a constant voltage to a current of 0.05 C. At this time, the battery was fully charged, that is, 100% SOC (State of Charge). After the fully charged battery was kept standing for 5 minutes, the battery was discharged at a constant current of 1.0 C to the discharge cut-off voltage. At this time, the discharge capacity was the actual capacity of the battery at 1.0 C, which was recorded as $C_0$. At a temperature of 45° C., the secondary battery was subjected to 100% DOD (100% Depth of Discharge, i.e. being fully charged and then fully discharged) charging and discharging cycle at a rate of 1 $C_0$/1 $C_0$ and through a Neware charging and discharging machine. When the cycle number reached 600, the cycle test was stopped. The secondary battery was charged to 100% SOC, then the secondary battery was disassembled so as to measure the corresponding thickness of the negative electrode plate, which was recorded as $H_1$. After the battery was cycled for 600 times at a rate of 1 $C_0$/1 $C_0$ and a temperature of 45° C., the cyclic expansion rate of the negative electrode plate was determined as $(H_1/H_0-1)\times100\%$.

2) Testing of Low Temperature Lithium Precipitation Performance of Battery

Firstly, the actual capacity $C_0$ of the battery at 1.0 C was measured according to the method shown in Testing 1). Then the battery was placed in an environment of −10° C., charged at a constant current of x $C_0$ to the charge cut-off voltage, and then charged at a constant voltage to a current of 0.05 $C_0$ and kept standing for 5 minutes; afterwards the battery core was disassembled to observe the lithium precipitation at the interface. If there was no lithium precipitation on the surface of the negative electrode plate, the charging rate would be increased for testing again until there was lithium precipitation on the surface of the negative electrode plate. The maximum charging rate when there was no lithium precipitation on the surface of the negative electrode plate was recorded and determined as the rate of low temperature lithium precipitation.

3) Testing of High Temperature Cycle Performance of Battery

Firstly, the actual capacity $C_0$ of the battery at 1.0 C was measured according to the method shown in Testing 1). Then the battery at a temperature of 60° C. was charged at a constant current of 1.0 $C_0$ to the charge cut-off voltage, and then charged at a constant voltage to a current of 0.05 $C_0$; afterwards the battery was discharged at a constant current of 1.0 $C_0$ to the discharge cut-off voltage. The above was a charging and discharging cycle, and the discharge capacity at this time was regarded as the discharge capacity of the first cycle. Then, the charging and discharging cycle was repeated, the value of the discharge capacity during the cycle process was recorded, and the capacity retention rate of each cycle was calculated. Record the cycle number of the battery until the cyclic capacity retention rate was attenuated to 80% of the discharge capacity of the first cycle.

TABLE 1

| | First material | | | | | Second material | | | | | Negative electrode film | | Negative electrode plate | High temperature cyclic expansion rate of negative electrode plate % | Low temperature lithium precipitation rate of negative electrode plate | High temperature cycle number of battery |
|---|---|---|---|---|---|---|---|---|---|---|---|---|---|---|---|---|
| | type | mass ratio % | powder compacted density g/cm³ | $D_v50$ μm | graphitization degree % | type | mass ratio % | powder compacted density g/cm³ | $D_v50$ μm | graphitization degree % | pressed density g/cm³ | areal density mg/cm² | surface smoothness L | | | |
| Ex. 1 | artificial graphite | 75 | 1.90 | 18.3 | 97.1 | natural graphite | 25 | 1.87 | 15.4 | 98.2 | 1.7 | 11.0 | 40.0 | 45 | 0.41$C_0$ | 928 |
| Ex. 2 | artificial graphite | 75 | 1.88 | 16.0 | 94.2 | natural graphite | 25 | 1.85 | 13.0 | 97.8 | | | 42.7 | 41 | 0.43$C_0$ | 1078 |
| Ex. 3 | artificial graphite | 75 | 1.85 | 15.2 | 93.2 | natural graphite | 25 | 1.83 | 12.5 | 97.2 | | | 45.6 | 34 | 0.45$C_0$ | 1189 |
| Ex. 4 | artificial graphite | 75 | 1.83 | 14.6 | 92.7 | natural graphite | 25 | 1.82 | 11.6 | 97.1 | | | 48.3 | 35 | 0.38$C_0$ | 1005 |
| Ex. 5 | artificial graphite | 75 | 1.80 | 12.4 | 90.2 | natural graphite | 25 | 1.79 | 10.5 | 96.5 | | | 50.0 | 36 | 0.35$C_0$ | 967 |

TABLE 1-continued

|  | | First material | | | | | Second material | | | | Negative electrode film | | Negative electrode plate | High temperature cyclic expansion rate of negative electrode plate % | Low temperature lithium precipitation rate of negative electrode plate | High temperature cycle number of battery |
|---|---|---|---|---|---|---|---|---|---|---|---|---|---|---|---|---|
|  | type | mass ratio % | powder compacted density g/cm$^3$ | $D_v50$ μm | graphitization degree % | type | mass ratio % | powder compacted density g/cm$^3$ | $D_v50$ μm | graphitization degree % | pressed density g/cm$^3$ | areal density mg/cm$^2$ | surface smoothness L | | | |
| Ex. 6 | artificial graphite | 90 | 1.84 | 13.8 | 93.2 | natural graphite | 10 | 1.81 | 11.1 | 97.6 | | | 49.7 | 32 | 0.32C$_0$ | 1229 |
| Ex. 7 | artificial graphite | 80 | 1.84 | 13.8 | 93.2 | natural graphite | 20 | 1.81 | 11.1 | 97.6 | | | 47.8 | 32 | 0.48C$_0$ | 1225 |
| Ex. 8 | artificial graphite | 70 | 1.84 | 13.8 | 93.2 | natural graphite | 30 | 1.81 | 11.1 | 97.6 | | | 45.2 | 38 | 0.38C$_0$ | 958 |
| Ex. 9 | artificial graphite | 75 | 1.84 | 13.8 | 93.2 | natural graphite | 25 | 1.81 | 11.1 | 97.6 | 1.6 | 11.0 | 49.2 | 33 | 0.41C$_0$ | 1135 |
| Ex. 10 | artificial graphite | 75 | 1.84 | 13.8 | 93.2 | natural graphite | 25 | 1.81 | 11.1 | 97.6 | 1.8 | 11.0 | 41.5 | 39 | 0.36C$_0$ | 924 |
| Ex. 11 | artificial graphite | 75 | 1.84 | 13.8 | 93.2 | natural graphite | 25 | 1.81 | 11.1 | 97.6 | 1.7 | 10.0 | 45.8 | 33 | 0.49C$_0$ | 1128 |
| Ex. 12 | artificial graphite | 75 | 1.84 | 13.8 | 93.2 | natural graphite | 25 | 1.81 | 11.1 | 97.6 | 1.7 | 13.0 | 46.6 | 38 | 0.32C$_0$ | 949 |
| CE. 1 | artificial graphite | 75 | 1.84 | 13.8 | 93.2 | natural graphite | 25 | 1.81 | 11.1 | 97.6 | 1.5 | 8.0 | 54.3 | 49 | 0.18C$_0$ | 782 |
| CE. 2 | artificial graphite | 75 | 1.84 | 13.8 | 93.2 | natural graphite | 25 | 1.81 | 11.1 | 97.6 | 1.9 | 14.0 | 38.6 | 56 | 0.10C$_0$ | 563 |
| CE. 3 | artificial graphite | 75 | 1.92 | 13.8 | 97.5 | natural graphite | 25 | 1.81 | 11.1 | 97.6 | 1.7 | 11.0 | 38.0 | 52 | 0.18C$_0$ | 678 |
| CE. 4 | artificial graphite | 75 | 1.75 | 13.8 | 88.3 | natural graphite | 25 | 1.81 | 11.1 | 97.6 | 1.7 | 11.0 | 52.7 | 47 | 0.12C$_0$ | 508 |
| CE. 5 | artificial graphite | 75 | 1.80 | 12.0 | 90.5 | natural graphite | 25 | 1.77 | 10.0 | 96.1 | 1.6 | 13.0 | 51.8 | 48 | 0.22C$_0$ | 725 |
| CE. 6 | artificial graphite | 75 | 1.89 | 16.0 | 94.1 | natural graphite | 25 | 1.87 | 13.8 | 98.6 | 1.8 | 10.0 | 38.1 | 59 | 0.23C$_0$ | 678 |

TABLE 2

|  | | First material | | | | | Second material | | | | Negative electrode film | | Negative electrode plate | High temperature cyclic expansion rate of negative electrode plate % | Low temperature lithium precipitation rate of negative electrode plate | High temperature cycle number of battery |
|---|---|---|---|---|---|---|---|---|---|---|---|---|---|---|---|---|
|  | type | mass ratio % | powder compacted density g/cm$^3$ | $D_v50$ μm | graphitization degree % | type | mass ratio % | powder compacted density g/cm$^3$ | $D_v50$ μm | graphitization degree % | pressed density g/cm$^3$ | areal density mg/cm$^2$ | surface smoothness L | | | |
| Ex. 13 | artificial graphite | 55 | 1.83 | 18.5 | 90.8 | natural graphite | 45 | 1.95 | 19.2 | 98.5 | 1.6 | 7.5 | 45.1 | 54 | 0.46C$_0$ | 907 |
| Ex. 14 | artificial graphite | 55 | 1.80 | 17.4 | 90.1 | natural graphite | 45 | 1.94 | 18.6 | 98.3 | | | 47.3 | 51 | 0.55C$_0$ | 1085 |
| Ex. 15 | artificial graphite | 55 | 1.79 | 16.8 | 89.8 | natural graphite | 45 | 1.93 | 17.5 | 98.2 | | | 49.2 | 48 | 0.75C$_0$ | 1323 |

TABLE 2-continued

| | First material | | | | Second material | | | | Negative electrode film | | Negative electrode plate | High temperature cyclic expansion rate of negative electrode plate % | Low temperature lithium precipitation rate of negative electrode plate | High temperature cycle number of battery |
|---|---|---|---|---|---|---|---|---|---|---|---|---|---|---|
| | type | powder compacted density g/cm$^3$ | $D_v50$ μm | graphitization degree % | type | cycle number of battery | powder compacted density g/cm$^3$ | $D_v50$ μm | graphitization degree % | pressed density g/cm$^3$ | areal density mg/cm$^2$ | surface smoothness L | | | |
| Ex. 16 | artificial graphite | 55 | 1.77 | 15.3 | 89.6 | natural graphite | 45 | 1.92 | 17.0 | 98.0 | | | 51.4 | 49 | 0.70$C_0$ | 1289 |
| Ex. 17 | artificial graphite | 55 | 1.75 | 16.0 | 89.2 | natural graphite | 45 | 1.91 | 16.1 | 98.1 | | | 55.0 | 52 | 0.63$C_0$ | 1104 |
| Ex. 18 | artificial graphite | 80 | 1.79 | 15.8 | 89.8 | natural graphite | 20 | 1.93 | 17.5 | 98.2 | | | 54.5 | 45 | 0.55$C_0$ | 1523 |
| Ex. 19 | artificial graphite | 70 | 1.79 | 15.8 | 89.8 | natural graphite | 30 | 1.93 | 17.5 | 98.2 | | | 52.9 | 43 | 0.58$C_0$ | 1397 |
| Ex. 20 | artificial graphite | 60 | 1.79 | 15.8 | 89.8 | natural graphite | 40 | 1.93 | 17.5 | 98.2 | | | 51.2 | 46 | 0.62$C_0$ | 1347 |
| Ex. 21 | artificial graphite | 50 | 1.79 | 15.8 | 89.8 | natural graphite | 50 | 1.93 | 17.5 | 98.2 | | | 49.1 | 45 | 0.75$C_0$ | 1334 |
| Ex. 22 | artificial graphite | 55 | 1.79 | 15.8 | 89.8 | natural graphite | 45 | 1.93 | 17.5 | 98.2 | 1.5 | 7.5 | 54.6 | 47 | 0.56$C_0$ | 1320 |
| Ex. 23 | artificial graphite | 55 | 1.79 | 15.8 | 89.8 | natural graphite | 45 | 1.93 | 17.5 | 98.2 | 1.7 | 7.5 | 45.3 | 54 | 0.54$C_0$ | 927 |
| Ex. 24 | artificial graphite | 55 | 1.79 | 15.8 | 89.8 | natural graphite | 45 | 1.93 | 17.5 | 98.2 | 1.6 | 7.0 | 49.3 | 45 | 0.68$C_0$ | 1301 |
| Ex. 25 | artificial graphite | 55 | 1.79 | 15.8 | 89.8 | natural graphite | 45 | 1.93 | 17.5 | 98.2 | 1.6 | 10.0 | 48.5 | 48 | 0.46$C_0$ | 1086 |
| CE. 7 | artificial graphite | 55 | 1.79 | 15.8 | 89.8 | natural graphite | 45 | 1.93 | 17.5 | 98.2 | 1.4 | 6.0 | 57.9 | 56 | 0.20$C_0$ | 735 |
| CE. 8 | artificial graphite | 55 | 1.79 | 15.8 | 89.8 | natural graphite | 45 | 1.93 | 17.5 | 98.2 | 1.8 | 11.0 | 43.2 | 58 | 0.11$C_0$ | 867 |
| CE. 9 | artificial graphite | 55 | 1.89 | 15.8 | 95.3 | natural graphite | 45 | 1.93 | 17.5 | 98.2 | 1.6 | 7.5 | 42.1 | 60 | 0.28$C_0$ | 906 |
| CE. 10 | artificial graphite | 55 | 1.70 | 15.8 | 87.5 | natural graphite | 45 | 1.93 | 17.5 | 98.2 | 1.6 | 7.5 | 56.8 | 55 | 0.32$C_0$ | 701 |
| CE. 11 | artificial graphite | 55 | 1.75 | 15.1 | 89.0 | natural graphite | 45 | 1.91 | 15.5 | 95.9 | 1.5 | 10.0 | 57.2 | 53 | 0.31$C_0$ | 713 |
| CE. 12 | artificial graphite | 55 | 1.85 | 19.0 | 94.1 | natural graphite | 45 | 1.98 | 19.3 | 98.6 | 1.7 | 7.0 | 43.6 | 60 | 0.23$C_0$ | 835 |

It could be seen from the results of comparison between Examples 1-12 and Comparative Examples 1-6, when the positive electrode plate comprised one or more of layered lithium transition metal oxides and modified compounds thereof, the negative electrode plate comprised artificial graphite and natural graphite both, and the smoothness L of the surface the negative electrode film away from the negative electrode current collector satisfied 40≤L≤50, especially satisfied 43≤L≤48, the negative electrode plate could have lower cyclic expansion during the charging and discharging process and the negative electrode plate could also have effectively increased lithium ions transmission performance, thereby decreasing the cyclic expansion and improving the low temperature power performance of the secondary battery while having higher energy density. Moreover, the capacity retention rate of the battery during the high temperature cycle process was also significantly increased.

It could be seen from the results of comparison between Examples 13-25 and Comparative Examples 7-12, when the positive electrode plate comprised one or more of lithium containing phosphates with olivine structure and modified compounds thereof, the negative electrode plate comprised artificial graphite and natural graphite both, and the smoothness L of the surface of the negative electrode film away from the negative electrode current collector satisfied 45≤L≤55, especially satisfied 48≤L≤52, the negative electrode plate could have lower cyclic expansion during the charging and discharging process and the negative electrode plate could also have effectively increased lithium ions transmission performance, thereby decreasing the cyclic expansion and improving the low temperature power performance of the secondary battery while having higher energy density. More preferably, the capacity retention rate of the battery during the high temperature cycle process was also significantly increased.

In addition, it could be seen from the results of Examples 6-8 and Examples 18-21, when the positive electrode plate comprised a certain type of positive active material, the negative electrode plate comprised artificial graphite and natural graphite both, and the mass ratio of natural graphite in the negative active material was within a certain range, it was more conducive to make the battery have lower cyclic expansion, higher low temperature power performance and higher high temperature cycle performance at the same time.

It could be seen from the results of Examples 9-12 and Examples 22-25, when the positive electrode plate comprised a certain type of positive active material, the negative electrode plate comprised artificial graphite and natural graphite both, and the pressed density of the negative electrode film and/or the areal density of the negative electrode film were within a certain range, it was more conducive to make the battery have lower cyclic expansion, higher low temperature power performance and higher high temperature cycle performance at the same time.

Some exemplary embodiments of the present application are provided as follows.

Embodiment 1. A secondary battery comprising a positive electrode plate and a negative electrode plate, the positive electrode plate comprising a positive electrode current collector and a positive electrode film disposed on at least one surface of the positive electrode current collector and comprising a positive active material, the negative electrode plate comprising a negative electrode current collector and a negative electrode film disposed on at least one surface of the negative electrode current collector and comprising a negative active material, wherein the positive active material comprises one or more of layered lithium transition metal oxides and modified compounds thereof; the negative active material comprises a first material and a second material, the first material comprises artificial graphite, the second material comprises natural graphite; and a smoothness L of a surface of the negative electrode film away from the negative electrode current collector satisfies: $40 \leq L \leq 50$, preferably $43 \leq L \leq 48$.

Embodiment 2. The secondary battery according to Embodiment 1, wherein the natural graphite constitutes from 10% to 50% by mas of the negative active material, preferably from 15% to 30% by mass.

Embodiment 3. The secondary battery according to Embodiment 1 or 2, wherein the negative active material has a powder compacted density of from 1.7 g/cm$^3$ to 1.9 g/cm$^3$ under an action force of 30,000 N, preferably from 1.75 g/cm$^3$ to 1.85 g/cm$^3$.

Embodiment 4. The secondary battery according to any one of Embodiments 1-3, wherein the negative active material has a graphitization degree of from 92% to 96%, preferably from 93% to 95%.

Embodiment 5. The secondary battery according to any one of Embodiments 1-4, wherein the negative active material has a volume average particle size D$_v$50 of from 11 μm to 15 μm, preferably from 12 μm to 14 μm.

Embodiment 6. The secondary battery according to any one of Embodiments 1-5, wherein the negative electrode film has a pressed density of from 1.6 g/cm$^3$ to 1.8 g/cm$^3$, preferably from 1.65 g/cm$^3$ to 1.75 g/cm$^3$; and/or, the negative electrode film has an areal density of from 10 mg/cm$^2$ to 13 mg/cm$^2$, preferably from 10.5 mg/cm$^2$ to 11.5 mg/cm$^2$.

Embodiment 7. A secondary battery comprising a positive electrode plate and a negative electrode plate, the positive electrode plate comprising a positive electrode current collector and a positive electrode film disposed on at least one surface of the positive electrode current collector and comprising a positive active material, the negative electrode plate comprising a negative electrode current collector and a negative electrode film disposed on at least one surface of the negative electrode current collector and comprising a negative active material, wherein the positive active material comprises one or more of lithium-containing phosphates with olivine structure and modified compounds thereof; the negative active material comprises a first material and a second material, the first material comprises artificial graphite, the second material comprises natural graphite; and a smoothness L of a surface of the negative electrode film away from the negative electrode current collector satisfies: $45 \leq L \leq 55$, preferably $48 \leq L \leq 52$.

Embodiment 8. The secondary battery according to Embodiment 7, wherein the natural graphite constitutes from 10% to 50% by mas of the negative active material, preferably from 35% to 50% by mass.

Embodiment 9. The secondary battery according to Embodiment 7 or 8, wherein the negative active material has a powder compacted density of from 1.8 g/cm$^3$ to 1.9 g/cm$^3$ under an action force of 30,000 N, preferably from 1.82 g/cm$^3$ to 1.88 g/cm$^3$.

Embodiment 10. The secondary battery according to any one of Embodiments 7-9, wherein the negative active material has a graphitization degree of from 92% to 95%, preferably from 93% to 94%.

Embodiment 11. The secondary battery according to any one of Embodiments 7-10, wherein the negative active material has a volume average particle size D$_v$50 of from 15 μm to 19 μm, preferably from 16 μm to 18 μm.

Embodiment 12. The secondary battery according to any one of Embodiments 7-11, wherein the negative electrode film has a pressed density of from 1.5 g/cm$^3$ to 1.7 g/cm$^3$, preferably from 1.55 g/cm$^3$ to 1.65 g/cm$^3$; and/or, the negative electrode film has an areal density of from 7 mg/cm$^2$ to 10 mg/cm$^2$, preferably from 7 mg/cm$^2$ to 8 mg/cm$^2$.

Embodiment 13. An apparatus comprising the secondary battery according to any one of Embodiments 1-12.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A secondary battery comprising a positive electrode plate and a negative electrode plate, the positive electrode plate comprising a positive electrode current collector and a positive electrode film disposed on at least one surface of the positive electrode current collector and comprising a positive active material, the negative electrode plate comprising a negative electrode current collector and a negative electrode film disposed on at least one surface of the negative electrode current collector and comprising a negative active material, wherein the positive active material comprises one or more of layered lithium transition metal oxides and modified compounds thereof, and the "modified compounds thereof" means that the layered lithium transition metal oxides are modified by doping and/or surface coating;

the negative active material comprises a first material and a second material, the first material comprises artificial graphite, the second material comprises natural graphite;

a smoothness L of a surface of the negative electrode film away from the negative electrode current collector satisfies: 40≤L≤50.

2. The secondary battery according to claim 1, wherein the natural graphite constitutes from 10% to 50% by mas of the negative active material.

3. The secondary battery according to claim 1, wherein the negative active material has a powder compacted density of from 1.7 g/cm$^3$ to 1.9 g/cm$^3$ under an action force of 30,000 N.

4. The secondary battery according to claim 1, wherein the negative active material has a graphitization degree of from 92% to 96%.

5. The secondary battery according to claim 1, wherein the negative active material has a volume average particle size $D_v50$ of from 11 μm to 15 μm.

6. The secondary battery according to claim 2, wherein the negative active material has a volume average particle size $D_v50$ of from 11 μm to 15 μm.

7. The secondary battery according to claim 3, wherein the negative active material has a volume average particle size $D_v50$ of from 11 μm to 15 μm.

8. The secondary battery according to claim 4, wherein the negative active material has a volume average particle size $D_v50$ of from 11 μm to 15 μm.

9. The secondary battery according to claim 1, wherein the negative electrode film has a pressed density of from 1.6 g/cm$^3$ to 1.8 g/cm$^3$; and/or the negative electrode film has an areal density of from 10 mg/cm$^2$ to 13 mg/cm$^2$.

10. The secondary battery according to claim 5, wherein the negative electrode film has a pressed density of from 1.6 g/cm$^3$ to 1.8 g/cm$^3$; and/or the negative electrode film has an areal density of from 10 mg/cm$^2$ to 13 mg/cm$^2$.

11. A secondary battery comprising a positive electrode plate and a negative electrode plate, the positive electrode plate comprising a positive electrode current collector and a positive electrode film disposed on at least one surface of the positive electrode current collector and comprising a positive active material, the negative electrode plate comprising a negative electrode current collector and a negative electrode film disposed on at least one surface of the negative electrode current collector and comprising a negative active material, wherein the positive active material comprises one or more of lithium-containing phosphates with olivine structure and modified compounds thereof, and the modified compounds means that the compounds are modified by doping and/or surface coating;

the negative active material comprises a first material and a second material, the first material comprises artificial graphite, the second material comprises natural graphite;

a smoothness L of a surface of the negative electrode film away from the negative electrode current collector satisfies: 45≤L≤55.

12. The secondary battery according to claim 11, wherein the natural graphite constitutes from 10% to 50% by mas of the negative active material.

13. The secondary battery according to claim 11, wherein the negative active material has a powder compacted density of from 1.8 g/cm$^3$ to 1.9 g/cm$^3$ under an action force of 30,000 N.

14. The secondary battery according to claim 11, wherein the negative active material has a graphitization degree of from 92% to 95%.

15. The secondary battery according to claim 11, wherein the negative active material has a volume average particle size $D_v50$ of from 15 μm to 19 μm.

16. The secondary battery according to claim 12, wherein the negative active material has a volume average particle size $D_v50$ of from 15 μm to 19 μm.

17. The secondary battery according to claim 13, wherein the negative active material has a volume average particle size $D_v50$ of from 15 μm to 19 μm.

18. The secondary battery according to claim 14, wherein the negative active material has a volume average particle size $D_v50$ of from 15 μm to 19 μm.

19. The secondary battery according to claim 11, wherein the negative electrode film has a pressed density of from 1.5 g/cm$^3$ to 1.7 g/cm$^3$; and/or, the negative electrode film has an areal density of from 7 mg/cm$^2$ to 10 mg/cm$^2$.

20. The secondary battery according to claim 15, wherein the negative electrode film has a pressed density of from 1.5 g/cm$^3$ to 1.7 g/cm$^3$; and/or, the negative electrode film has an areal density of from 7 mg/cm$^2$ to 10 mg/cm$^2$.

* * * * *